US008936799B2

(12) United States Patent
Schmid et al.

(10) Patent No.: US 8,936,799 B2
(45) Date of Patent: *Jan. 20, 2015

(54) PIGMENTS WITH IMPROVED SPARKLING EFFECT

(75) Inventors: Raimund Schmid, Neustadt (DE); Norbert Mronga, Dossenheim (DE); Patrice Bujard, Courtepin (CH); Steven Jones, Budd Lake, NJ (US); Paul Cao, Cleveland, TN (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/502,640

(22) PCT Filed: Oct. 18, 2010

(86) PCT No.: PCT/EP2010/065581
§ 371 (c)(1),
(2), (4) Date: Jul. 30, 2012

(87) PCT Pub. No.: WO2011/051122
PCT Pub. Date: May 5, 2011

(65) Prior Publication Data
US 2012/0282311 A1 Nov. 8, 2012

Related U.S. Application Data

(60) Provisional application No. 61/255,514, filed on Oct. 28, 2009.

(51) Int. Cl.
| *A61K 8/02* | (2006.01) |
| *A61Q 1/02* | (2006.01) |
| *C09B 67/22* | (2006.01) |
| *C23C 16/06* | (2006.01) |
| *C09D 7/12* | (2006.01) |
| *C09C 1/00* | (2006.01) |
| *C09D 5/36* | (2006.01) |
| *C09D 11/037* | (2014.01) |
| *C09D 11/322* | (2014.01) |
| *C09D 17/00* | (2006.01) |
| *C08K 3/34* | (2006.01) |
| *C08K 9/02* | (2006.01) |

(52) U.S. Cl.
CPC ............ *C09D 7/1225* (2013.01); *C09C 1/0021* (2013.01); *C09C 1/0024* (2013.01); *C09D 5/36* (2013.01); *C09D 7/1283* (2013.01); *C09D 7/1291* (2013.01); *C09D 11/037* (2013.01); *C09D 11/322* (2013.01); *C09D 17/004* (2013.01); *C01P 2004/61* (2013.01); *C01P 2004/62* (2013.01); *C01P 2006/60* (2013.01); *C08K 3/34* (2013.01); *C08K 9/02* (2013.01)
USPC .......... 424/401; 106/31.9; 106/417; 427/250; 427/255.28; 8/637.1

(58) Field of Classification Search
USPC .................. 424/401; 106/31.9, 417; 427/250, 427/255.28; 8/637.1
See application file for complete search history.

(56) References Cited

U.S. PATENT DOCUMENTS

| 4,525,388 | A | * | 6/1985 | Rehder et al. ................. 427/221 |
| 4,594,279 | A | | 6/1986 | Yoneno et al. |
| 6,162,374 | A | | 12/2000 | Schoen et al. |
| 6,267,810 | B1 | | 7/2001 | Pfaff et al. |
| 6,294,010 | B1 | | 9/2001 | Pfaff et al. |
| 6,517,628 | B1 | | 2/2003 | Pfaff et al. |
| 6,743,285 | B2 | | 6/2004 | Anselmann et al. |
| 7,387,669 | B2 | | 6/2008 | Mronga et al. |
| 7,485,183 | B2 | | 2/2009 | Hochstein et al. |
| 2005/0112331 | A1 | | 5/2005 | Donea et al. |
| 2007/0015012 | A1 | * | 1/2007 | Bujard et al. .............. 428/845.1 |
| 2008/0207774 | A1 | | 8/2008 | Krishnan |
| 2008/0305184 | A1 | | 12/2008 | Heinz et al. |
| 2010/0104873 | A1 | * | 4/2010 | Wang et al. ................... 428/406 |

FOREIGN PATENT DOCUMENTS

| DE | 102005025609 | 2/2006 |
| EP | 1218455 | 7/2002 |
| EP | 1469042 | 10/2004 |
| JP | 59-008766 | 1/1984 |
| JP | 60-071881 | 4/1985 |
| JP | 2000-026753 | 1/2000 |
| JP | 2000-198945 | 7/2000 |
| JP | 2004-292816 | 10/2004 |
| WO | 2004061012 | 7/2004 |
| WO | 2004085530 | 10/2004 |
| WO | 2006110359 | 10/2006 |
| WO | 2008/118827 | 10/2008 |
| WO | 2009/007248 | 1/2009 |
| WO | 2010/066605 A1 | 6/2010 |

OTHER PUBLICATIONS

University of Colorado—Boulder. Physics 1230: Light and Color. Slide 20.*
Application of Perlite in Ceramic Pigments; translated by Liu Hetian, Ceramics, vol. 22(6), pp. 12-13, 1965.
English language Machine Translation of DE102005025609, Feb. 9, 2006.
English language Machine Translation of WO2004085530, Oct. 7, 2004.
English language abstract of JP 59-008766 (Jan. 18, 1984).

* cited by examiner

*Primary Examiner* — Frederick Krass
*Assistant Examiner* — Tracy Liu
(74) *Attorney, Agent, or Firm* — Shruti Costales

(57) ABSTRACT

The present invention relates to pigments with improved and adjustable sparkling effect comprising A) a plate-like substrate of perlite coated with (a) dielectric material, and/or metal; and B) a plate-like substrate of mica, coated with (a) dielectric material, and/or a metal; and a process for their production and their use in paints, ink jet printing, for dyeing textiles, for pigmenting coatings (paints), printing inks, plastics, cosmetics, glazes for ceramics and glass. The pigments show an improved sparkle effect; in particular an attractive high sparkle intensity.

16 Claims, 4 Drawing Sheets

PIGMENTS WITH IMPROVED SPARKLING EFFECT

The present invention relates to pigments with adjustable and/or improved sparkling effect comprising A) a plate-like substrate of perlite coated with (a) dielectric material and/or metal; and B) a plate-like substrate of mica, coated with (a) dielectric material and/or metal; and a process for their production and their use in paints, ink-jet printing, for dyeing textiles, for pigmenting coatings (paints), printing inks, plastics, cosmetics, glazes for ceramics and glass. The pigments show an improved sparkle effect; in particular an attractive high sparkle intensity.

Sparkling effects on an object can be defined as locations where compared to the adjacent area in directed light a light of higher intensity is observed.

They are caused by light reflecting pigments incorporated into a coating on the surface of the object or by mass coloration of the object with light reflecting pigments.

The light reflecting properties of pigments are depending on particle size, particle shape and chemical composition. A weak light reflection is perceived when flakes with diameters <5 µm reflect incoming light. Human eyes are perceiving light reflections caused by flakes with diameters of 20 µm and more as strong.

Natural- or synthetic mica based pigments are causing sparkling effects when incorporated in paints or plastics.

In the past sparkling of effect pigments have been described only verbally. Depending on the diameter of the flakes sparkling effects were perceived and described as being "subtle" (flake diameters ~5 µm-15 µm), "strong" (flake diameters ~15-25 µm), "eye-catching" (flake diameters ~25-100 µm) and finally "extreme" (flake diameters >100 µm).

As this classification was not good enough in terms of quantitative description of sparkling effects measuring devices have been developed during the last 10 years. One example is the Byk-mac from Byk-Gardner GmbH (Lausitzer Straße 8, 82538 Geretsried, Germany). This device is allowing to measure sparkle and graininess for flake characterization. For three different illumination angles the sparkling behaviour of flakes is characterized with the following parameters:

Sparkling area ($S\_a$) corresponds to the number of light reflections within the measuring given;

Sparkling intensity ($S\_i$) corresponds the intensity of the light reflections.

Under diffuse light no sparkling effect can be observed. The visual appearance of sparkling pigments under diffuse light conditions is verbally described with texture, coarseness or graininess. The Byk-mac is determining the graininess value $G_{diff}$ to describe that effect.

The most common sparkling effect pigments are based on metal oxide coated glass flakes or metal oxide coated alumina flakes. Such effect pigments are providing a characteristical sparkling effect.

DE102005025609 discloses non-metallic pigment mixtures with high metal brightness, useful e.g. in cosmetic, lacquers and colors, comprising gold color interference pigments and further pigments of silver-white, silver-gray and black-gray interference pigments.

EP1218455 relates to pigment mixtures in the form of a dispersion or a powder that consist of at least two components. Component A represents coated or uncoated BiOCl pigments in the form of powders or dispersions and component B represents pearly luster pigments, platelet-shaped, needle-shaped or spherical dyes and/or fillers. The admixing of component B with the BiOCl pigments enables increased metallic lustre to be imparted to the application systems, the colour effect is increased, and novel colour effects are achieved.

EP1469042 discloses a pigment mixture comprising component A containing glass flakes based effect pigment(s) and component B containing organic and/or inorganic flake-form, needle-shaped, spherical or crystalline colorants and/or fillers. The admixture of one or more colorants to the coated glass flakes enables a rainbow effect to be imparted on the application systems, increases the color effect and achieves novel color effects.

WO2004085530 relates to a high-gloss non-toxic nacreous pigment preparation containing one or several binding agents and a pigment mixture that comprises at least two components A and B at a ratio of 20:80 to 80:20, component A representing BiOCl pigments and component B representing nacreous pigments.

U.S. Pat. No. 7,387,669 discloses luster pigments having pronounced sparkle which are based on aluminum platelets which have been coated with iron oxide and have in the precoated state an average platelet size from 8 to 30 µm, an average platelet thickness from 300 to 600 nm and an aspect ratio from 15 to 70.

U.S. Pat. No. 6,517,628 (EP1045014) relates to a pigment mixture comprising: a component A comprising a mica, $SiO_2$ flake, glass flake, $Al_2O_3$ flake or polymer flake substrate coated with two or more layers including at least one layer of high refractive index adjacent to at least one layer of low refractive index and component B comprising a platelet-shaped, acicular or spherical colorant and/or filler not within the definition of component A. Component B may comprise pearl luster pigments, colored glass particles, carbon black, organic color pigments and/or inorganic color pigments. It is the object of U.S. Pat. No. 6,517,628 to provide a pigment mixture which is notable for comparatively high hiding power and which lends itself well to incorporation into the respective system in which it is used.

U.S. Pat. No. 6,294,010 relates to a pigment mixture comprising a component A and a component B, wherein component A comprises $Al_2O_3$ flakes coated with one or more metals, metal oxides or metal sulfides, and wherein component B comprises one or more functional pigments. Preferred are $Al_2O_3$ flakes coated with $TiO_2$, $Fe_2O_3$, or a combination of $TiO_2$ and $Fe_2O_3$.

Component B comprises an electrically conductive pigment, a magnetic pigment, an IR-reflective pigment, a laser-markable pigment, or a mixture thereof. U.S. Pat. No. 6,294,010 provides a pigment mixture with additional functions (conductivity, magnetism, IR-reflection) caused by component B U.S. Pat. No. 6,267,810 relates to a pigment mixture comprising a component A and a component B, wherein component A comprises $Al_2O_3$ flakes coated with one or more metals, metal oxides or metal sulfides, and wherein component B comprises special-effect pigments. Component B may comprise i) one or more of metal platelets coated with one or more metal oxides, ii) graphite platelets, iii) aluminum platelets, iv) phyllosilicates, v) $Fe_2O_3$-flakes, $SiO_2$-flakes, or $TiO_2$-flakes uncoated or coated with one or more metal oxides, vi) glass platelets and/or vii) ceramic platelets. The term "special-effect pigments" may also comprise pearl luster pigments, i.e. mica flake pigments coated with one or more metal oxides, which are obtainable, for example, from Merck KGaA, Darmstadt, under the tradenames Iriodin®, Afflair® and Timiron®. U.S. Pat. No. 6,267,810 describes blends of coated Al$_2$O$_3$ flakes (=known for sparkle) with all other effect pigments known at that time. The disadvantage of pigments on basis of Al$_3$O$_3$-flakes is the complicated and expensive production process.

WO2006110359 relates to an effect pigment comprising a synthetic platelet coated with a translucent metal oxide film, said synthetic platelet having a size distribution characterized as a D10 of at least 9.5 microns, a D50 of between about 20 and less than 40 microns, and a D90 of over 35 to less than 85 microns. The metal oxide film can comprise titanium dioxide, or iron oxide. The synthetic platelet is selected from aluminum oxide, silicon dioxide, bismuth oxychloride, boron nitride, and glass. WO2006110359 teaches how to modify the particle size distribution of a pigment in order to optimize sparkle effect.

WO2004061012 discloses effect pigments comprising a coated mixture of at least two different materials wherein each of said at least two different materials is present from at least about 5 weight percent to about 95 weight percent based on the total of said at least two different materials and said effect pigment exhibits visual homogeneity. The effect pigment is a mixture of coated laminar platelets, preferably metal oxide-coated laminar platelets, in which the platelets are a mixture of different materials, e.g., glass and mica, and in which the effect pigment exhibits visual homogeneity which is produced by blending the different platelets before they are coated. WO2004061012 teaches that colouristic properties (chroma) of blends of effect pigments, which are prepared by blending the different substrates before they are coated, are much better than blends of effect pigments, which are obtained by blending substrates, which have already been coated beforehand.

US2008305184 relates to a pigment mixture consisting of at least two constituents, constituent A being uncoated, monocoated or multicoated glass lamellae, and constituent B being nacreous pigments based on phyllosilicates, SiO$_2$ lamellae, Fe$_2$O$_3$ lamellae or Al$_2$O$_3$ lamellae. The glass flakes are completely or partly coated with TiO$_2$ and/or Fe$_2$O$_3$. Component B may be a pearlescent pigment based on phyllosilicates which is coated with TiO$_2$ and/or Fe$_2$O$_3$. The phyllosilicate is preferably natural or synthetic mica. The pigment mixtures show strong glittering and high brightness.

The disadvantage of metal oxide coated glass flakes or metal oxide coated alumina flakes is the costly synthesis (high energy, waste) and the high price.

Conventional pearl pigments based on metal-coated or oxide coated, natural or synthetic mica show when measured with the Byk-mac a high sparkling intensity at the 15°-illumination angle. At higher illumination angles, the sparkling intensity is showing lower values. For example, metal-oxide coated synthetic mica pigments show high sparkle intensity S_i and high sparkle area S_a in the face angle. In down flop (=at higher angles) the number of light reflections (S_a) and their intensity (S_i) is much lower. Metal oxide coated perlite substrates show in down flop (at higher angles) high values for both S_a and S_i. Reference is made to FIGS. 1 to 4. One would expect that blending of metal-oxide coated synthetic mica substrates and metal oxide coated perlite substrates would lead to S_a and S_i values in between the borders of the pure pigments.

It has now surprisingly been found that blends of pigments based on metal-coated or oxide coated, natural or synthetic mica and metal-coated or oxide coated perlite can show a sparkling behavior which is not restricted by the borderlines of the single components; i.e. the blends can be characterized by an unexpected attractive higher sparkle intensity at all angles. Said "synergistic" effect is surprising and was not predictable. In addition, the sparkle area S_a and the angle dependence of S_a can be adjusted.

Accordingly, the present invention provides (interference) pigments with improved sparkling effect comprising
A) a plate-like substrate of perlite coated with (a) dielectric material, and/or metal; and
B) a plate-like substrate of mica, coated with (a) dielectric material, and/or a metal; and a process for their production and their use in paints, ink-jet printing, for dyeing textiles, for pigmenting coatings (paints), printing inks, plastics, cosmetics, glazes for ceramics and glass.

The dielectric material is especially a (metal) oxide, having a high, or low index of refraction. Examples are given below.

The wording "coated with (a) dielectric material and/or metal" means that the substrate can be coated with a layer of a dielectric material or a metal layer; or it can be coated with two, or more layers of dielectric material and/or metal. Examples of so-called "multilayer" pigments are given below. The metal layer is especially a thin semi-transparent metal layer.

From a design point of view it is desirable to have more possibilities to customize a styling in terms of angle dependant sparkling effect without being forced to use expensive pigments. Said object has been solved by the effect pigments of the present invention with improved and adjustable sparkling effect.

In principal, the coated plate-like substrate of perlite (perlite based pigment) can be contained in any amount as long as the effect of the present invention is obtained. Typically, the coated plate-like substrate of perlite (perlite based pigment) is contained in an amount of 1-80% by weight, especially 5-80% by weight, based on the sum of perlite based pigment and coated plate-like substrate of mica (mica based pigment). Outstanding effects are obtained, if the perlite based pigment is contained in an amount of 10-50% by weight, in particular, 10-40% by weight.

If a strong angle dependency of S_a is desired, the amount of perlite based pigment should be at 5-30% by weight. If a low angle dependency of S_a is desired the amount of perlite substrate should be preferably at 30-80% by weight.

Figure 1:
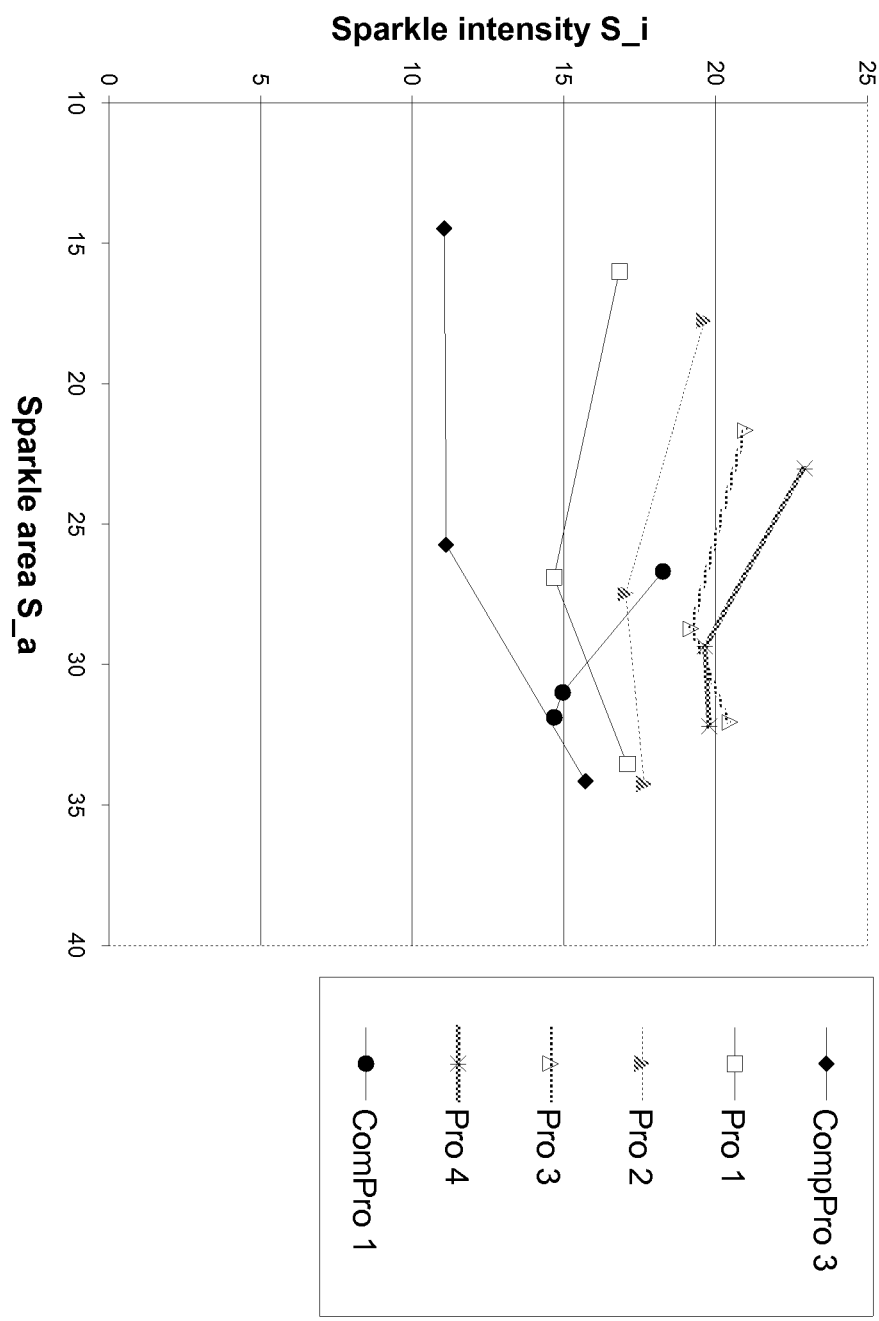
FIG. 1 is a graph showing the Sparkling intensity (S_i) vs. the Sparkling area (S_a) of pigments of the present invention (Pro1 to Pro4) and comparative pigments (ComPro1 and ComPro3).

The present invention is describing how new sparkling pigments can be tailored by using natural and/or synthetic mica together with perlite as substrates for oxide- and/or metal coatings.

It is also possible to blend the already oxide- or metal coated perlite- and mica-substrates. With the present invention the sparkling parameters S_a and S_i can be adjusted by selecting the appropriate material composition.

Natural and synthetic mica is biological inert and consequently it is acceptable for a wide range of applications. The substrate mica consists of thin platelets having a thickness of about 300 to 600 nm and a defined particle size distribution.

Pearlescent pigments on basis of natural- or synthetic mica coated with a metal oxide such as iron oxide, titanium oxide or metals like nickel or silver etc. are disadvantageous in that their sparkling effect cannot be customized without using such expensive materials like borosilicate- or alumina based sparkling pigments.

The term "mica" comprises natural mica, such as, for example, biotite, vermiculite, sericite, muscovite, phlogopite, fluorophlogopite, kaolinite or related as well as synthetic mica, such as, for example, synthetic fluorophlogopite.

Effect pigments having a core consisting of a transparent carrier material, such as, for example, natural, or synthetic mica are known. Reference is made, for example, to Gerhard Pfaff and Peter Reynders, Chem. Rev. 99 (1999) 1963-1981.

In a preferred embodiment of the present invention the plate-like substrate is muscovite, a natural mica. The muscovite mica has a thickness of about 300 to 600 nm and a defined particle size distribution.

In another preferred embodiment of the present invention the plate-like substrate is synthetic mica. It is preferred that the synthetic mica be fluorophlogopite. The fluorophlogopite, $KMg_3AlSi_3O_{10}F_2$, is exfoliated using a wet method process. Commercially available fluorophlogopite has typically an average thickness of 0.4 to 1.3 microns as determined by SEM measurement. Such wet process is described in Chinese patent publication CN1693200A. Chinese patent publication CN1693199A is a related patent application disclosing a method for precisely classifying mica powder synthesized by a wet method. Both patents are assigned to Sanbaoguangjing Mica Sci. & Tec. and are incorporated herein by reference. The wet process refers to a production method that uses water as the medium in a number of steps. First, the mica powder is passed through a high pressure water pump to carry out hydraulic breaking, then a centrifuge for dewatering, followed by a roller mill for grinding and pulping. After the mica passes through the roller mill, the mica is fed into a classifying pool and finally into a drying stove or oven to be baked until moisture content of the mica is less than 1%. The fluorophlogopite produced possesses positive characteristics of synthetic mica such as brightness, non-corrodibility and the absence of deleterious substances, e.g. Hg, Pb, As, etc. Other distinct quality characteristics include high purity, especially low Fe content (<0.2%).

The other platelet-like substrate (core) of the sparkling pigments of the present invention consists of perlite, which has been described in WO2009/007248 and WO2010/066605. By reducing the amount of 3D twin structure particles contained in milled expanded perlite, for example, by sedimentation, or centrifugation, to less than 5% by weight, especially less than 3% by weight, very especially less than 1% by weight, the matting effect of the 3D twin structure particles is reduced, which in turn leads to better colour homogeneity in all kind of applications.

The perlite based pigment particles generally have a length of from 2 μm to 5 mm, a width of from 2 μm to 2 mm, and an average thickness of less than 4 μm, and a ratio of length to thickness of at least 5:1, and contain a core of perlite, having two substantially parallel faces, the distance between which is the shortest axis of the core. The perlite core is coated with a dielectric material, especially a (metal) oxide, having a high index of refraction, and/or a metal layer, especially a thin semi-transparent metal layer. Said layers can be coated with additional layers. Preferably medium particle sizes of less than 150 μm and more than 5 μm are used.

The mica based pigment particles generally have medium diameters (D50 (D (v,0.5)) in between 5-500 μm. The medium diameter is preferably in a range of from 10-300 μm, more preferably 10-150 μm. The mica based pigment particles are preferably either coated with titanium oxide and/or iron oxide.

For example, the size distribution of a mica-based pigment, which has a D50 of 22 microns can be described as follows: 50 volume % of the platelets have a size up to and including 22 microns.

In principle many size combinations between the perlite and the mica based substrates are possible.

The most common particle size distributions of effect pigments are if described with the $d_{50}$-value 10 μm, 15 μm, 20 μm, 30 μm, 50 μm, 100 μm and 150 μm.

The present invention allows to customize the sparkling behaviour of a given particle size distribution of a mica based pigment and adjust the sparkling effect of that pigment by adding 1 to 90% by weight, especially 5-80% by weight of perlite based pigment based on the sum of perlite based pigment and mica based pigment.

In principle different families of particle size distributions of mica and perlite can be combined. Mica and perlite based pigments having extremely different sizes can be combined. For example, the smooth sparkling appearance of a mica based pigment with a medium particle size of 15 μm can modified with small amounts of perlite based pigment with a medium particle size of 100 μm. Alternatively mica based pigments with a medium particle size of 100 μm can modified with small amounts of perlite based pigment with a medium particle size of 15 μm.

In a preferred embodiment of the present invention, mica and perlite based pigments having similar particle sizes are combined. For example, mica based pigments with a medium particle size of 12 to 30 μm, such as, for example, ca. 12 μm, ca. 15 μm, ca. 20 μm, ca. 25 μm, or ca. 30 μm, can be combined with perlite based pigments with a medium particle size of 12 to 30 μm, such as, for example, ca. 15 μm, ca. 17 μm, ca. 20 μm, ca. 25 μm, or ca. 30 μm.

If, for example, a synthetic mica based pigment, especially a $TiO_2$ coated synthetic mica substrate, with a $d_{50}$ of ca. 20 μm is combined with a perlite based pigment, especially a $TiO_2$ coated perlite substrate, with a $d_{50}$ of ca. 25 μm the sparkling intensity at higher illumination angles is increasing strongly if 10-40% by weight perlite pigment is added. The best effect is achieved by adding 20-40% by weight of perlite pigment. Reference is made to FIG. 1.

Figure 2:
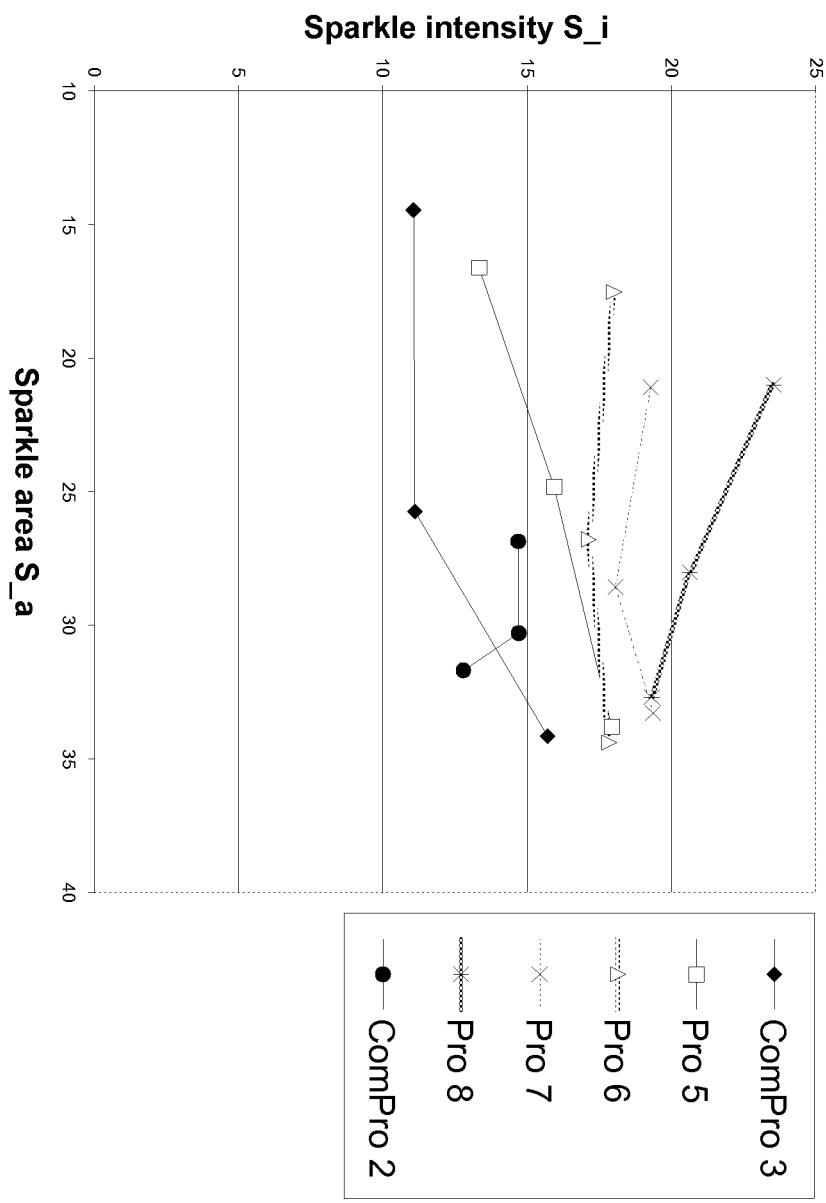
FIG. 2 is a graph showing the Sparkling intensity (S_i) vs. the Sparkling area (S_a) of pigments of the present invention (Pro5 to Pro8) and comparative pigments (ComPro2 and ComPro3).

More preferably mica and perlite based pigments with nearly the same medium particle size are to be combined. If, for example, a synthetic mica based pigment, especially a $TiO_2$ coated synthetic mica substrate, with a $d_{50}$ of ca. 20 μm is combined with a perlite based pigment, especially a $TiO_2$ coated perlite substrate, of same size the sparkling intensity at higher illumination angles is increasing strongly if 5-50% by weight perlite pigment is added. The best effect is achieved by adding 10-40% by weight of perlite pigment. Reference is made to FIG. 2.

Figure 3:
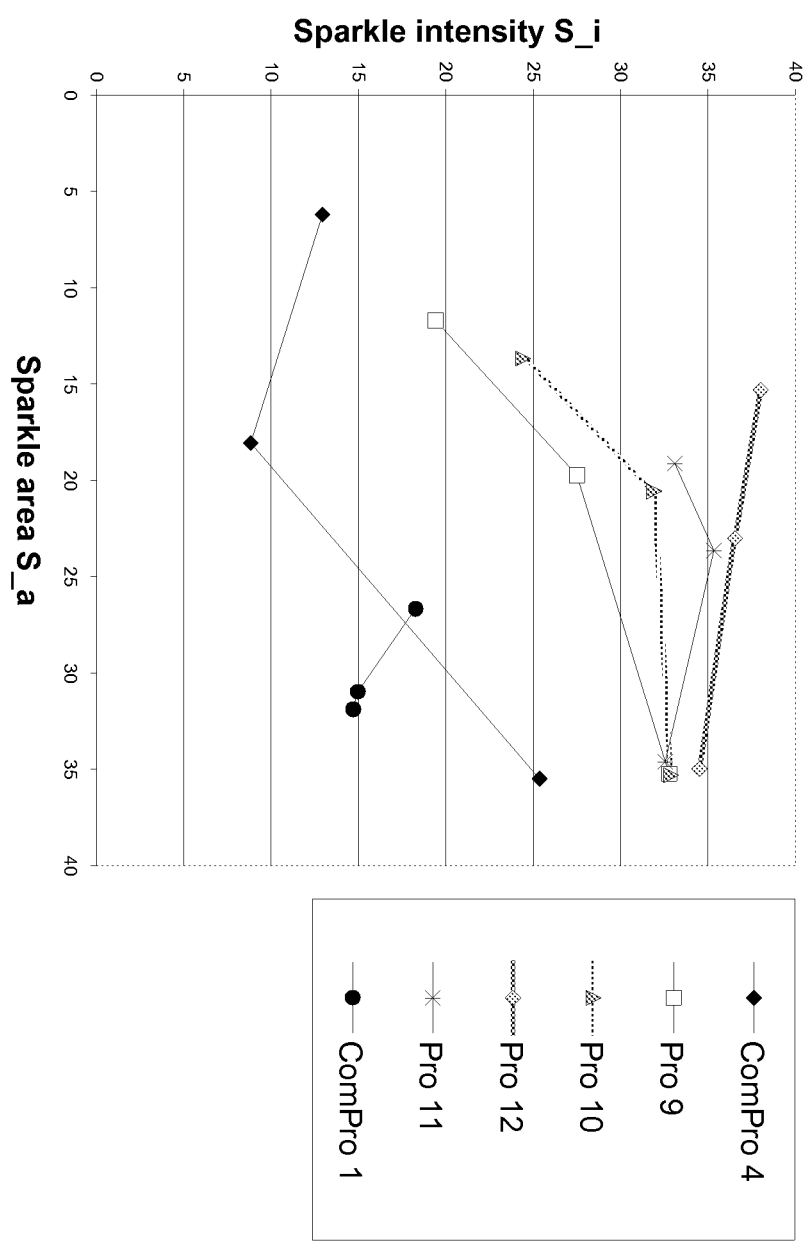
FIG. 3 is a graph showing the Sparkling intensity (S_i) vs. the Sparkling area (S_a) of pigments of the present invention (Pro9 to Pro12) and comparative pigments (ComPro1 and ComPro4).

In another preferred embodiment of the present invention, mica and perlite based pigments having different particle sizes are combined. If, for example, a synthetic mica based pigment, especially a $TiO_2$ coated synthetic mica substrate, with a $d_{50}$ of ca. 45 μm is combined with a perlite based pigment, especially a $TiO_2$ coated perlite substrate, with a $d_{50}$ of ca. 25 μm the sparkling intensity at higher illumination angles is increasing strongly if 5-50% by weight perlite pigment is added. The best effect is achieved by adding 10-40% by weight of perlite pigment. Reference is made to FIG. 3.

Figure 4:
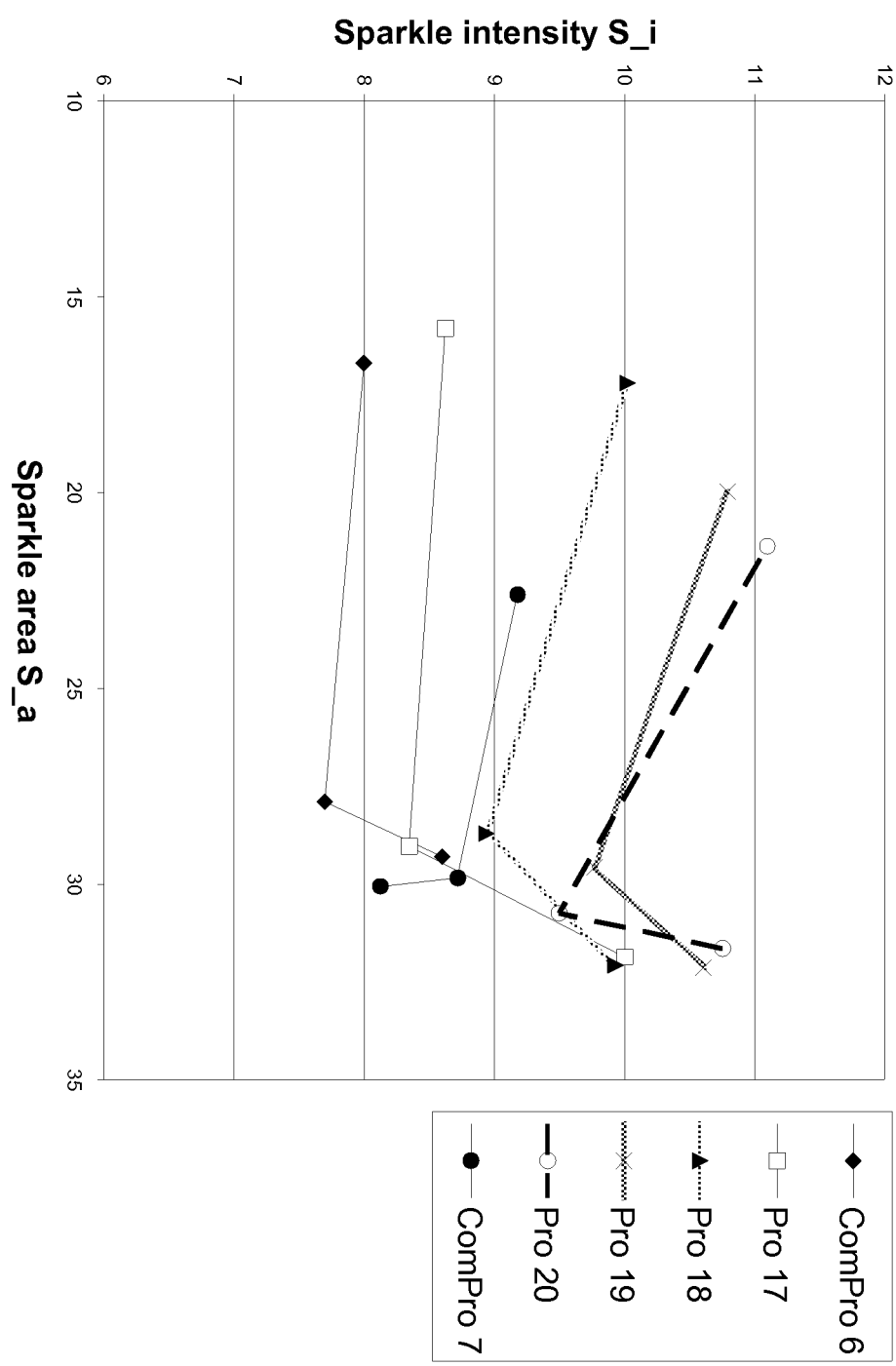
FIG. 4 is a graph showing the Sparkling intensity (S_i) vs. the Sparkling area (S_a) of pigments of the present invention (Pro17 to Pro20) and comparative pigments (ComPro6 and ComPro7).

If, for example, a synthetic mica based pigment, especially a $TiO_2$ coated synthetic mica substrate, with a $d_{50}$ of ca. 12 μm is combined with a perlite based pigment, especially a $TiO_2$ coated perlite substrate, with a $d_{50}$ of ca. 17.5 μm the sparkling intensity at higher illumination angles is increasing strongly if 10-40% by weight perlite pigment is added. Reference is made to FIG. 4.

From a colouristic view the following blends are advantageous:
1. Silver coloured mica based pigment and silver coloured perlite based pigment;
2. Mica based pigment and perlite based pigment with same colour (masstone colour (for example, red mica based pigment with red perlite based pigment) and/or interference colour (for example, mica based pigment having blue interference colour with perlite based pigment having blue interference colour);
3. Coloured mica based pigment and perlite based pigment with silver highlight;
4. Silver mica based pigment and coloured perlite based pigment (for example, silver mica based pigment with perlite based pigment having blue interference colour);
5. Coloured mica based pigment with complimentary perlite based pigment (for example, gold colour mica based pigment with blue perlite based pigment);
6. Coloured mica based pigment with adjacent perlite based pigment (for example, red mica based pigment with orange perlite based pigment, or red mica based pigment with violet perlite based pigment).

In principle, differently coated perlite and mica based substrates can be combined (=above blends 3 to 5), but the coatings of the perlite and mica based substrates are preferably the same (above blends 1 to 2). The choice of the mica and perlite components depends on desired design.

The coatings on the substrates consist preferably of $TiO_2$ and/or $Fe_2O_3$, or $TiO_2$, $Fe_2O_3$ and/or $SiO_2$ ($TiO_2$, $Fe_2O_3$, $TiO_2$ & $Fe_2O_3$, $TiO_2/SiO_2/TiO_2$, $Fe_2O_3/SiO_2/Fe_2O_3$, $TiO_2/SiO_2/Fe_2O_3$, $Fe_2O_3/SiO_2/TiO_2$ and $TiO_2$ & $Fe_2O_3/SiO_2/TiO_2$). Metallized substrates are also possible. The blending options depend on styling intention.

In a particularly preferred embodiment of the present invention the pigment comprises a $TiO_2$ coated synthetic mica based pigment with a $d_{50}$ of about 25 μm and a $TiO_2$ coated perlite based pigment of with a $d_{50}$ of about 20 μm, or the pigment comprises a $TiO_2$ coated synthetic mica based pigment with a $d_{50}$ of about 20 μm and a $TiO_2$ coated perlite based pigment with a $d_{50}$ of about 20 μm, or the pigment comprises a $TiO_2$ coated synthetic mica based pigment with a $d_{50}$ of about 40-60 μm and a $TiO_2$ coated perlite based pigment with a $d_{50}$ of about 20-30 μm, or the pigment comprises a $TiO_2$ coated mica based pigment with a $d_{50}$ of about 12 μm and a $TiO_2$ coated perlite based pigment with a $d_{50}$ of about 17 μm; or the pigment comprises a $Fe_2O_3$ coated synthetic mica based pigment with a $d_{50}$ of 20-25 μm and a $Fe_2O_3$ coated perlite based pigment with a $d_{50}$ of about 20 μm, or the pigment comprises a $Fe_2O_3$ coated synthetic mica based pigment with a $d_{50}$ of 40-60 μm and a $Fe_2O_3$ coated perlite based pigment with a $d_{50}$ of about 20-30 μm. A $d_{50}$ of about (or ca.)×μm means×μm±3 μm.

In addition, the pigments can comprise more than one mica based pigments and/or more than one perlite based pigments.

The pigments of the present invention with sparkle effect can be manufactured either
via dry blending of already (metal) oxide(s) and/or metal-coated perlite and mica substrates (synthetic or natural); or
via blending of uncoated perlite and mica substrates and coating them as blend in a CVD or a wet-chemical process. It is also possible to start the coating process with one of the substrates and add the other in a later stage.

Accordingly the present invention is directed to a process for the production of the pigments of the present invention, comprising
blending of a dielectric material and/or metal coated plate-like substrate of perlite and of a dielectric material and/or metal coated plate-like substrate of mica; or
blending of the uncoated plate-like perlite and mica substrates and
coating them in a chemical vapour deposition (CVD) or a wet-chemical process with one, or more layers of a dielectric material and/or a metal, wherein it is also possible to start the coating process with one of the substrates and add the other in a later stage, or to start the coating process with dielectric material and/or metal coated plate-like substrates.

In general, the procedure involves dispersing the particulate (flakes) and combining that dispersion with a precursor which results in the formation of a titanium oxide or iron oxide intermediate coating on the flakes. The concentration of the particulate in the water can vary from about 5 to 60%, although the generally preferred concentrations vary between about 10 and 20%. To the water/particulate slurry is added an appropriate metal ion source material. In the case of titanium, titanyl chloride or titanium tetrachloride is preferably used and in the case of iron, the source material is preferably ferric chloride. The pH of the resulting slurry is maintained at an appropriate level during the addition of the titanium or iron salt by the use of a suitable base such as sodium hydroxide in order to cause precipitation of a titanium dioxide or iron oxide intermediate on the particulate. If desired, layers of titanium and iron hydroxide and/or oxide (or other metals) can be deposited sequentially. If necessary to lower the pH, an aqueous acid such as hydrochloric acid can be used. The coated platelets can, if desired, be washed and dried before being calcined to the final effect pigment.

When titanium dioxide-coated products are prepared, both anatase and rutile crystal modifications are possible. Some substrates, including both mica and glass, are anatase directing, and it is therefore necessary to modify the foregoing procedure if a rutile product is desired. The modifications necessary to realize a rutile $TiO_2$ are known in the art.

One procedure involves the precipitation of a tin hydroxide or oxide entity on the surface of the particulate before the formation of the layer of titanium dioxide precursor. This procedure is described in detail in U.S. Pat. No. 4,038,099. Advantageously, an additional $SnO_2$ layer can be incorporated into the $TiO_2$ layer resulting in a pigment having the following layer structure: mica/$(SnO_2)TiO_2/SnO_2/TiO_2$. An alternative procedure is described in U.S. Pat. No. 5,433,779 and involves deposition of the titanium dioxide intermediate on the substrate in the presence of iron and calcium, magnesium and/or zinc salts without the use of tin. Other coating procedures, such as for example, chemical vapor deposition processes, can also be used.

The synthetic or natural mica and the perlite substrates can be coated in various ways.

Suitable metals for the (semi-transparent) metal layer are, for example, Cr, Ti, Mo, W, Al, Cu, Ag, Au, or Ni. The semi-transparent metal layer has typically a thickness of between 5 and 25 nm, especially between 5 and 15 nm.

According to the present invention the term "aluminum" comprises aluminum and alloys of aluminum. Alloys of aluminum are, for example described in G. Wassermann in Ullmanns Enzyklopädie der Industriellen Chemie, 4. Auflage, Verlag Chemie, Weinheim, Band 7, S. 281 to 292. Especially suitable are the corrosion stable aluminum alloys described on page 10 to 12 of WO00/12634, which comprise besides of aluminum silicon, magnesium, manganese, copper, zinc, nickel, vanadium, lead, antimony, tin, cadmium, bismuth, titanium, chromium and/or iron in amounts of less than 20 percent by weight, preferably less than 10 percent by weight.

The metal layer can be obtained by wet chemical coating or by chemical vapor deposition, for example, gas phase deposition of metal carbonyls. The mica/perlite substrate are suspended in an aqueous and/or organic solvent containing medium in the presence of a metal compound and is deposited onto the substrate by addition of a reducing agent. The metal compound is, for example, silver nitrate or nickel acetyl acetonate (WO03/37993).

According to U.S. Pat. No. 3,536,520 nickel chloride can be used as metal compound and hypophosphite can be used as reducing agent. According to EP-A-353544 the following compounds can be used as reducing agents for the wet chemical coating: aldehydes (formaldehyde, acetaldehyde, benzaldehyde), ketones (acetone), carbonic acids and salts thereof (tartaric acid, ascorbinic acid), reductones (isoascorbinic acid, triosereductone, reductine acid), and reducing sugars (glucose). However, it is also possible to use reducing alcohols (allyl alcohol), polyols and polyphenols, sulfites, hydrogensulfites, dithionites, hypophosphites, hydrazine, boron nitrogen compounds, metal hydrides and complex hydrides of aluminium and boron. The deposition of the metal layer can furthermore be carried out with the aid of a CVD method. Methods of this type are known. Fluidised-bed reactors are preferably employed for this purpose. EP-A-0741170 describes the deposition of aluminium layers by reduction of alkylaluminium compounds using hydrocarbons in a stream of inert gas. The metal layers can furthermore be deposited by gas-phase decomposition of the corresponding metal carbonyls in a heatable fluidised-bed reactor, as described in EP-A-045851. Further details on this method are given in WO93/12182. A further process for the deposition of thin metal layers, which can be used in the present case for the application of the metal layer to the substrate, is the known method for vapour deposition of metals in a high vacuum. It is described in detail in Vakuum-Beschichtung [Vacuum Coating], Volumes 1-5; Editors Frey, Kienel and Lobl, VDI-Verlag, 1995. In the sputtering process, a gas discharge (plasma) is ignited between the support and the coating material, which is in the form of plates (target). The coating material is bombarded with high-energy ions from the plasma, for example argon ions, and thus removed or atomised. The atoms or molecules of the atomised coating material are precipitated on the support and form the desired thin layer. The sputtering process is described in Vakuum-Beschichtung [Vacuum Coating], Volumes 1-5; Editors Frey, Kienel and Lobl, VDI-Verlag, 1995. For use in outdoor applications, in particular in the application in vehicle paints, the pigments can be provided with an additional weather-stabilising protective layer, the so-called post-coating, which simultaneously effects optimum adaptation to the binder system. Post-coatings of this type have been described, for example, in EP-A-0268918 and EP-A-0632109.

If pigments with stronger metallic appearance are desired, the thickness of the metal layer is greater than 25 nm to 100 nm, preferably 30 to 50 nm. If pigments with colored metal effects are desired, additional layers of colored or colorless metal oxides, metal nitrides, metal sulfides and/or metals can be deposited. These layers are transparent or semi-transparent. It is preferred that layers of high index of refraction and layers of low index of refraction alternate or that one layer is present, wherein within the layer the index of refraction is gradually changing. It is possible for the weathering resistance to be increased by means of an additional coating, which at the same time causes an optimal adaptation to the binder system (EP-A-268918 and EP-A-632109).

The metal and/or metal oxide coated perlite/mica flakes can be, as described in WO06/131472, treated with a plasma torch. The treatment promotes, for example, uniform crystallinity and/or coating densification. The rapid melting and solidification for certain particles can provide enhanced properties associated with the metal and/or metal oxide coating such as barrier properties, binding properties and crystalline surface formation. The short residence times in the reaction zones allow for rapid treatments. Further the processing conditions can be adjusted to selective melt and resolidificate and crystallize the surface and near surface of the particles. Moreover, surface leveling can be achieved which results in a uniform surface with minimal defects. Among other things, this may help to avoid agglomeration of particles.

The process comprises (A) providing coated perlite/mica flakes,
(B) entraining said coated perlite/mica flakes in a stream of gas for transport to a plasma torch;
(C) creating a plasma in said stream of gas to heat the outer surface of the coated perlite/mica flakes;
(D) permitting said coated perlite/mica flakes to cool; and (E) collecting said coated perlite/mica flakes.

The plasma torch is preferably an induction plasma torch. The preferred induction plasma torches for use in the process of the present invention are available from Tekna Plasma Systems, Inc. of Sherbrooke, Quebec, Canada. Boulos et al., U.S. Pat. No. 5,200,595, is hereby incorporated by reference for its teachings relative to the construction and operation of plasma induction torches.

In one preferred embodiment of the present invention, the pigments comprise on the perlite and mica substrate
(a) a dielectric layer,
(b) a metal layer, and
(c) a dielectric layer. Such pigments have high infrared reflectivity and high visible transmission.

Preferably, metallic silver is used as the metal layer because it offers high reflectivity to infrared radiation together with high transmission to solar radiation providing its reflection losses are minimized. Although high purity metallic silver films are preferred, certain impurities and/or alloying metals can be tolerated as long as they do not significantly reduce the infrared reflectivity or significantly increase the visible absorptivity. The thickness of the metallic silver layer is within a range of from 3 to 20 nm.

Suitable materials for layer (c) are materials which are transparent to solar and infrared radiation in the thicknesses used. Additionally, these materials serve as anti-reflection coatings to minimize the reflection of visible light by the silver layer, and these materials preferably have high indices of refraction. Some suitable materials for layer (c) include, but are not limited to, titanium dioxide, silicon dioxide, silicon monoxide, bismuth oxide, tin oxide, indium oxide, chromium oxide, zinc sulfide and magnesium fluoride. Titanium dioxide is a preferred material because of its high refractive index and because it has been found to have minimum inter-diffusion with silver.

Suitable materials for layer (a) are transparent materials which cooperate with layer (b) to minimize visible light reflection losses by the silver layer. The transparent materials suitable for layer (c) are also suitable for layer (a), and titanium dioxide is also a preferred material for this layer. Layer (a) can be formed from the same material as layer (c), or from a different material in which case it would probably have a different thickness.

The thicknesses for layer (c) and layer (a) are chosen to maximize solar transmission and infrared reflectivity. It has been found that a thickness of from about 15 to about 50 nm is suitable for layer (c). The thickness of layer (a) is then chosen based upon a number of considerations such as whether it is desired to achieve the optimum solar transmission, the optimum ratio of transmission to thermal reflectivity or some combination between these optimized values.

In most cases, the optical properties desired can be achieved by choosing a thickness of layer of between about 15 nm and about 50 nm.

In one preferred embodiment of the present invention, the interference pigments comprise materials having a "high" index of refraction, which is defined herein as an index of refraction of greater than about 1.65, and optionally materials having a "low" index of refraction, which is defined herein as an index of refraction of about 1.65 or less. Various (dielectric) materials that can be utilized including inorganic materials such as metal oxides, metal suboxides, metal fluorides, metal oxyhalides, metal sulfides, metal chalcogenides, metal nitrides, metal oxynitrides, metal carbides, combinations thereof, and the like, as well as organic dielectric materials. These materials are readily available and easily applied by physical, or chemical vapor deposition processes, or by wet chemical coating processes.

Optionally a $SiO_2$ layer can be arranged between the perlite/mica substrate and the materials having a "high" index of refraction. By applying a $SiO_2$ layer on the perlite/mica substrate the perlite surface is protected against chemical alteration, such as, for example, swelling and leaching of perlite/mica components. The thickness of the $SiO_2$ layer is in the range of 5 to 200 nm, especially 20 to 150 nm. The $SiO_2$ layer is preferably prepared by using an organic silane compound, such as tetraethoxy silane (TEOS). The $SiO_2$ layer can be replaced by thin layers (thickness 1 to 20 nm) of $Al_2O_3$, $Fe_2O_3$ or $ZrO_2$.

Furthermore, the $SiO_2$-coated, or $TiO_2$-coated perlite/mica flakes may, as described in EP-A-0 982 376, be coated with a nitrogen-doped carbon layer. The process described in EP-A-0 982 376 comprises the following steps:
(a) suspending the $SiO_2$, or $TiO_2$ coated perlite/mica flakes in a liquid,
(b) where appropriate adding a surface-modifier and/or a polymerization catalyst,
(c), before or after step (b), adding one or more polymers comprising nitrogen and carbon atoms, or one or more monomers capable of forming such polymers,
(d) forming a polymeric coating on the surface of the flakes,
(e) isolating the coated flakes and
(f) heating the coated flakes to a temperature of from 100 to 600° C. in a gaseous atmosphere.

The polymer may be a polypyrrole, a polyamide, a polyaniline, a polyurethane, a nitrile rubber or a melamine-formaldehyde resin, preferably a polyacrylonitrile, or the monomer is a pyrrole derivative, an acrylonitrile, a methacrylonitrile, a crotonitrile, an acrylamide, a methacrylamide or a crotonamide, preferably an acrylonitrile, methacrylonitrile or crotonitrile, most preferably an acrylonitrile.

Preferably, the flakes are heated in step (f) initially to from 100° C. to 300° C. in an oxygen-containing atmosphere and then to from 200 to 600° C. in an inert gas atmosphere.

The present invention therefore relates also to pigments based on perlite/mica flakes comprising over the entire surface of the silicon oxide, or titanium oxide coated perlite/mica flakes a layer consisting of from 50 to 95% by weight carbon, from 5 to 25% by weight nitrogen and from 0 to 25% by weight of the elements hydrogen, oxygen and/or sulfur, the percentage by weight data relating to the total weight of the layer (PAN).

The thickness of the nitrogen-doped carbon layer is generally from 10 to 150 nm, preferably from 30 to 70 nm. In said embodiment preferred pigments have the following layer structure: perlite/mica substrate/$TiO_2$/PAN, perlite/mica substrate/$TiO_2$/PAN/$TiO_2$, perlite/mica substrate/$TiO_2$/PAN/$SiO_2$/PAN.

In an especially preferred embodiment, the interference pigments on the basis of the perlite/mica substrate comprise a layer of a dielectric material having a "high" refractive index, that is to say a refractive index greater than about 1.65, preferably greater than about 2.0, most preferred greater than about 2.2, which is applied to the entire surface of the perlite/mica substrate. Examples of such a dielectric material are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron (II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$), or combinations thereof. The dielectric material is preferably a metal oxide. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$ or ZnO, with $TiO_2$ being especially preferred.

It is possible to obtain pigments that are more intense in colour and more transparent by applying, on top of the $TiO_2$ layer, a metal oxide of low refractive index, such as $SiO_2$, $Al_2O_3$, AlOOH, $B_2O_3$ or a mixture thereof, preferably $SiO_2$, and optionally applying a further $TiO_2$ layer on top of the latter layer (EP-A-892832, EP-A-753545, WO93/08237, WO98/53011, WO9812266, WO9838254, WO99/20695, WO00/42111, and EP-A-1213330). Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference.

Accordingly, preferred interference pigments comprise besides (a) a metal oxide of high refractive index in addition (b) a metal oxide of low refractive index, wherein the difference of the refractive indices is at least 0.1.

Pigments on the basis of perlite/mica substrates, which have been coated by a wet chemical method, in the indicated order are particularly preferred:

$TiO_2$, $(SnO_2)TiO_2$ (substrate: perlite/mica; layer: $(SnO_2)$ $TiO_2$, preferably in the rutile modification), titanium suboxide, $TiO_2$/titanium suboxide, $Fe_2O_3$, $Fe_3O_4$, $TiFe_2O_5$, $Cr_2O_3$, $ZrO_2$, $Sn(Sb)O_2$, $BiOCl$, $Al_2O_3$, $Ce_2S_3$, $MoS_2$, $Fe_2O_3 \cdot TiO_2$ (substrate: perlite/mica; mixed layer of $Fe_2O_3$ and $TiO_2$), $TiO_2/Fe_2O_3$ (substrate: perlite/mica; first layer: $TiO_2$; second layer: $Fe_2O_3$), $TiO_2$/Berlin blau, $TiO_2/Cr_2O_3$, or $TiO_2$/FeTiO_3. In general the layer thickness ranges from 1 to 1000 nm, preferably from 1 to 300 nm.

In another particularly preferred embodiment the present invention relates to interference pigments containing at least three alternating layers of high and low refractive index, such as, for example, $TiO_2/SiO_2/TiO_2$, $SnO_2)TiO_2/SiO_2/TiO_2$, $TiO_2/SiO_2/TiO_2/SiO_2/TiO_2$, $Fe_2O_3/SiO_2/TiO_2$, or $TiO_2/SiO_2/Fe_2O_3$.

Preferably the layer structure is as follows:
(a) a coating having a refractive index>1.65,
(b) a coating having a refractive index≤1.65,
(c) a coating having a refractive index>1.65, and
(d) optionally an outer protective layer.

The thickness of the individual layers of high and low refractive index on the base substrate is essential for the optical properties of the pigment. The thickness of the individual layers, especially metal oxide layers, depends on the field of use and is generally 10 to 1000 nm, preferably 15 to 800 nm, in particular 20 to 600 nm.

The thickness of layer (A) is 10 to 550 nm, preferably 15 to 400 nm and, in particular, 20 to 350 nm. The thickness of layer (B) is 10 to 1000 nm, preferably 20 to 800 nm and, in particular, 30 to 600 nm. The thickness of layer (C) is 10 to 550 nm, preferably 15 to 400 nm and, in particular, 20 to 350 nm.

Particularly suitable materials for layer (A) are metal oxides, metal sulfides, or metal oxide mixtures, such as $TiO_2$, $Fe_2O_3$, $TiFe_2O_5$, $Fe_3O_4$, $BiOCl$, $COO$, $Co_3O_4$, $Cr_2O_3$, $VO_2$, $V_2O_3$, $Sn(Sb)O_2$, $SnO_2$, $ZrO_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. Metal sulfide coatings are preferably selected from sulfides of tin, silver, lanthanum, rare earth metals, preferably cerium, chromium, molybdenum, tungsten, iron, cobalt and/or nickel.

Particularly suitable materials for layer (B) are metal oxides or the corresponding oxide hydrates, such as $SiO_2$, $MgF_2$, $Al_2O_3$, $AlOOH$, $B_2O_3$ or a mixture thereof, preferably $SiO_2$.

Particularly suitable materials for layer (C) are colorless or colored metal oxides, such as $TiO_2$, $Fe_2O_3$, $TiFe_2O_5$, $Fe_3O_4$, $BiOCl$, $CoO$, $Co_3O_4$, $Cr_2O_3$, $VO_2$, $V_2O_3$, $Sn(Sb)O_2$, $SnO_2$, $ZrO_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. The $TiO_2$ layers can additionally contain an absorbing material, such as carbon, selectively absorbing colorants, selectively absorbing metal cations, can be coated with absorbing material, or can be partially reduced.

Interlayers of absorbing or nonabsorbing materials can be present between layers (A), (B), (C) and (D). The thickness of the interlayers is 1 to 50 nm, preferably 1 to 40 nm and, in particular, 1 to 30 nm. Such an interlayer can, for example, consist of $SnO_2$. It is possible to force the rutile structure to be formed by adding small amounts of $SnO_2$ (see, for example, WO93/08237).

In this embodiment preferred interference pigments have the following layer structure:

| | | | |
|---|---|---|---|
| perlite/mica | $TiO_2$ | $SiO_2$ | $TiO_2$ |
| perlite/mica | $TiO_2$ | $SiO_2$ | $Fe_2O_3$ |
| perlite/mica | $TiO_2$ | $SiO_2$ | $TiO_2 \cdot Fe_2O_3$ |
| perlite/mica | $TiO_2$ | $SiO_2$ | $(Sn,Sb)O_2$ |
| perlite/mica | $(Sn,Sb)O_2$ | $SiO_2$ | $TiO_2$ |
| perlite/mica | $Fe_2O_3$ | $SiO_2$ | $(Sn,Sb)O_2$ |
| perlite/mica | $TiO_2 \cdot Fe_2O_3$ | $SiO_2$ | $TiO_2 \cdot Fe_2O_3$ |
| perlite/mica | $TiO_2$ | $SiO_2$ | $MoS_2$ |
| perlite/mica | $TiO_2$ | $SiO_2$ | $Cr_2O_3$ |
| perlite/mica | $Cr_2O_3$ | $SiO_2$ | $TiO_2$ |
| perlite/mica | $Fe_2O_3$ | $SiO_2$ | $TiO_2$ |
| perlite/mica | $TiO_2$ | $Al_2O_3$ | $TiO_2$ |
| perlite/mica | $Fe_2TiO_5$ | $SiO_2$ | $TiO_2$ |
| perlite/mica | $TiO_2$ | $SiO_2$ | $Fe_2TiO_5/TiO_2$ |
| perlite/mica | TiO suboxides | $SiO_2$ | TiO suboxides |
| perlite/mica | $TiO_2$ | $SiO_2$ | $TiO_2/SiO_2/TiO_2$ + Prussian Blue |
| perlite/mica | $TiO_2$ | $SiO_2$ | $TiO_2/SiO_2/TiO_2$ |
| perlite/mica | $TiO_2/SiO_2/TiO_2$ | $SiO_2$ | $TiO_2/SiO_2/TiO_2$ |
| perlite/mica | $(SnO_2)TiO_2$ | $SiO_2$ | $(SnO_2)TiO_2$ |

The metal oxide layers can be applied by CVD (chemical vapour deposition) or by wet chemical coating. The metal oxide layers can be obtained by decomposition of metal carbonyls in the presence of water vapour (relatively low molecular weight metal oxides such as magnetite) or in the presence of oxygen and, where appropriate, water vapour (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A-45 851), by means of hydrolytic gaseous phase decomposition of metal alcoholates (e.g. titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised-bed reactor (EP-A-045 851 and EP-A-106 235). $Al_2O_3$ layers (B) can advantageously be obtained by controlled oxidation during the cooling of aluminium-coated pigments, which is otherwise carried out under inert gas (DE-A-195 16 181).

Phosphate-, chromate- and/or vanadate-containing and also phosphate- and $SiO_2$-containing metal oxide layers can be applied in accordance with the passivation methods described in DE-A-42 36 332 and in EP-A-678 561 by means of hydrolytic or oxidative gaseous phase decomposition of oxide-halides of the metals (e.g. $CrO_2Cl_2$, $VOCl_3$), especially of phosphorus oxyhalides (e.g. $POCl_3$), phosphoric and phosphorous acid esters (e.g. di- and tri-methyl and di- and tri-ethyl phosphite) and of amino-group-containing organyl silicon compounds (e.g. 3-aminopropyl-triethoxy- and -trimethoxy-silane).

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13

331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, WO 98/53001 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A-4125134, EP-A-332071, EP-A-707, 050, WO93/19131, or WO06/131472.

For the purpose of coating, the substrate particles are suspended in water and one or more hydrolysable metal salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, calcinated, it being possible to optimise the calcinating temperature with respect to the coating in question. If desired, after individual coatings have been applied, the pigments can be separated off, dried and, where appropriate, calcinated, and then again re-suspended for the purpose of precipitating further layers.

The metal oxide layers are also obtainable, for example, in analogy to a method described in DE-A-195 01 307, by producing the metal oxide layer by controlled hydrolysis of one or more metal acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxypropylamine. The organic solvent is a water-miscible organic solvent such as a $C_{1-4}$alcohol, especially isopropanol.

Suitable metal acid esters are selected from alkyl and aryl alcoholates, carboxylates, and carboxyl-radical- or alkyl-radical- or aryl-radical-substituted alkyl alcoholates or carboxylates of vanadium, titanium, zirconium, silicon, aluminium and boron. The use of triisopropyl aluminate, tetraisopropyl titanate, tetraisopropyl zirconate, tetraethyl orthosilicate and triethyl borate is preferred. In addition, acetylacetonates and acetoacetylacetonates of the afore-mentioned metals may be used. Preferred examples of that type of metal acid ester are zirconium acetylacetonate, aluminium acetylacetonate, titanium acetylacetonate and diisobutyloleyl acetoacetylaluminate or diisopropyloleyl acetoacetylacetonate and mixtures of metal acid esters, for example Dynasil® (Hüls), a mixed aluminium/silicon metal acid ester.

As a metal oxide having a high refractive index, titanium dioxide is preferably used, the method described in U.S. Pat. No. 3,553,001 being used, in accordance with an embodiment of the present invention, for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped. Addition of a precursor for $Al_2O_3$ or MgO in the starting solutions is a way for improving the morphology of the $TiO_2$ layer.

This method, also referred to as the "titration method", is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated. In principle, the anatase form of $TiO_2$ forms on the surface of the starting pigment. By adding small amounts of $SnO_2$, however, it is possible to force the rutile structure to be formed. For example, as described in WO 93/08237, tin dioxide can be deposited before titanium dioxide precipitation and the product coated with titanium dioxide can be calcined at from 800 to 900° C.

In an especially preferred embodiment of the present invention the perlite/mica flakes are mixed with distilled water in a closed reactor and heated at about 90° C. The pH is set to about 1.8 to 2.2 and a preparation comprising $TiOCl_2$, HCl, glycine and distilled water is added slowly while keeping the pH constant (1.8 to 2.2) by continuous addition of 1M NaOH solution. Reference is made to WO08/104,467. By adding an amino acid, such as glycine, during the deposition of the $TiO_2$ it is possible to improve the quality of the $TiO_2$ coating to be formed. Advantageously, a preparation comprising $TiOCl_2$, HCl, and glycine and distilled water is added to the substrate flakes in water.

The $TiO_2$ can optionally be reduced by usual procedures: U.S. Pat. No. 4,948,631 ($NH_3$, 750-850° C.), WO93/19131 ($H_2$, >900° C.) or DE-A-19843014 (solid reduction agent, such as, for example, silicon, >600° C.).

Where appropriate, an $SiO_2$ (protective) layer can be applied on top of the titanium dioxide layer, for which the following method may be used: A soda waterglass solution is metered into a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

It is possible to obtain pigments that are more intense in colour and more transparent by applying, on top of the $TiO_2$ layer, a metal oxide of "low" refractive index, that is to say a refractive index smaller than about 1.65, such as $SiO_2$, $Al_2O_3$, AlOOH, $B_2O_3$ or a mixture thereof, preferably $SiO_2$, and applying a further $Fe_2O_3$ and/or $TiO_2$ layer on top of the latter layer. Such multicoated interference pigments comprising a perlite/mica substrate and alternating metal oxide layers of with high and low refractive index can be prepared in analogy to the processes described in WO98/53011 and WO99/20695.

It is, in addition, possible to modify the powder colour of the pigment by applying further layers such as, for example, coloured metal oxides or Berlin Blue, compounds of transition metals, e.g. Fe, Cu, Ni, Co, Cr, or organic compounds such as dyes or colour lakes.

In addition, the pigment according to the invention can also be coated with poorly soluble, firmly adhering, inorganic or organic colourants. Preference is given to the use of colour lakes and, especially, aluminium colour lakes. For that purpose an aluminium hydroxide layer is precipitated, which is, in a second step, laked by using a colour lake (DE-A-24 29 762 and DE-A-29 28 287).

Furthermore, the pigment according to the invention may also have an additional coating with complex salt pigments, especially cyanoferrate complexes (EP-A-141 173 and DE-A-23 13 332).

To enhance the weather and light stability the (multilayer) perlite/mica flakes can be, depending on the field of application, subjected to a surface treatment. Useful surface treatments are, for example, described in DE-A-2215191, DE-A-3151354, DE-A-3235017, DE-A-3334598, DE-A-4030727, EP-A-649886, WO97/29059, WO99/57204, and U.S. Pat. No. 5,759,255. Said surface treatment might also facilitate the handling of the pigment, especially its incorporation into various application media.

In a preferred embodiment of the present invention is directed to pigments which contain a core of perlite/mica and comprise a mixed layer of $Al_2O_3/TiO_2$. The mixed layer can contain up to 20 mol % $Al_2O_3$. The mixed layer of $Al_2O_3/TiO_2$ is obtained by slowly adding an aqueous aluminum and titanium salt solution to a suspension of the material being coated, which suspension has been heated to about 50-100° C., especially 70-80° C., and maintaining a substantially constant pH value of about from 0.5 to 5, especially about from 1.2 to 2.5, by simultaneously metering in a base such as, for example, aqueous ammonia solution or aqueous alkali metal hydroxide solution. As soon as the desired layer thickness of precipitated $Al_2O_3/TiO_2$ has been achieved, the addition of titanium and aluminum salt solution and base is stopped.

The thickness of the mixed layer of $Al_2O_3/TiO_2$ is in general in the range of 20 to 200 nm, especially 50 to 150 nm. Preferably the pigments comprise a $TiO_2$ layer on top of the mixed layer of $Al_2O_3/TiO_2$ having a thickness of 1 to 50 nm, especially 10 to 20 nm. By varying the thickness of the mixed layer of $Al_2O_3/TiO_2$ the flop of the pigments can be enhanced and controlled as desired.

In another preferred embodiment of the present invention is directed to pigments which contain a core of perlite/mica and consist of subsequent layers of $TiO_2/SnO_2/TiO_2$, wherein the $TiO_2$ layer next to the perlite/mica substrate has a thickness of 1 to 20 nm and is preferably prepared by using titanium alcoholates, especially tetraisopropyl titanate.

If the substrate combinations of the present invention are used pigments with customized sparkling effect can be made. Accordingly, the present invention relates to a method for producing pigments with improved sparkle effect and/or for adjusting the sparkle effect by blending a dielectric material and/or a metal layer coated plate-like substrate of perlite with a dielectric material and/or a metal layer coated plate-like substrate of mica.

The pigments of the present invention with interference layers can show superior brilliance, clear and intense colors, and intense sparkle effects.

On the one hand blending of perlite based pigments with mica based pigments results in a more angle dependent sparkling area (S_a). On the other hand blending of mica based pigments with perlite based pigments results in a higher sparkling intensity (S_i), which effect may even be more pronounced in downflop. In other words, S_i and S_a can be adjusted, as desired, a higher S_i and/or a more angle dependent S_a may be obtained.

The (effect) pigments according to the invention can be used for all customary purposes, for example for colouring polymers in the mass, coatings (including effect finishes, including those for the automotive sector) and printing inks (including offset printing, intaglio printing, bronzing and flexographic printing), and also, for example, for applications in cosmetics, in ink-jet printing, for dyeing textiles, glazes for ceramics and glass as well as laser marking of papers and plastics. Such applications are known from reference works, for example "Industrielle Organische Pigmente" (W. Herbst and K. Hunger, VCH Verlagsgesellschaft mbH, Weinheim/New York, 2nd, completely revised edition, 1995) and Gerhard Pfaff and Peter Reynders, Chem. Rev. 99 (1999) 1963-1981; "Spezielle Effektpigmente" (G. Pfaff, Vincentz Network, Hannover, $2^{nd}$ revised edition, 2007).

When the pigments according to the invention are interference pigments (effect pigments), they may be goniochromatic and result in brilliant, highly saturated (lustrous) colours with adjusted sparkling effect. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar colour to the effect pigment. Especially interesting combination effects are obtained, however, in analogy to, for example, EP-A-388 932 or EP-A-402 943, when the colour of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from 103 to 108 g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for coatings or printing inks, such as, for example, boiled linseed oil, nitrocellulose, alkyd resins, melamine resins and urea-formaldehyde resins or acrylic resins.

Depending on the intended purpose, it has proved advantageous to use the effect pigments or effect pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30 percent by weight, especially from 2 to 15 percent by weight, based on the end product.

The (effect) pigments according to the invention can be added in any tinctorially effective amount to the high molecular weight organic material being pigmented. A pigmented substance composition comprising a high molecular weight organic material and from 0.01 to 80 percent by weight, preferably from 0.1 to 30 percent by weight, based on the high molecular weight organic material, of a pigment according to the invention is advantageous. Concentrations of from 1 to 20 percent by weight, especially of about 10 percent by weight, can often be used in practice. High concentrations, for example those above 30 percent by weight, are usually in the form of concentrates ("masterbatches") which can be used as colorants for producing pigmented materials having a relatively low pigment content, the pigments according to the invention having an extraordinarily low viscosity in customary formulations so that they can still be processed well. For the purpose of pigmenting organic materials, the effect pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10 percent by weight, based on the high molecular weight organic material. Especially high goniochromicity is provided by the preferred combination of an effect pigment according to the invention with a coloured pigment of another colour, especially of a complementary colour, with colorations made using the effect pigment and colorations made using the coloured pigment having, at a measurement angle of 10 Degrees, a difference in hue (DELTAH*) of from 20 to 340, especially from 150 to 210. Preferably, the effect pigments according to the invention are combined with transparent coloured pigments, it being possible for the transparent coloured pigments to be present either in the same medium as the effect pigments according to the invention or in a neighbouring medium. An example of an arrangement in which the effect pigment and the coloured pigment are advantageously present in neighbouring media is a multi-layer effect coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the effect pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together. Dispersing an effect pigment according to the invention in the high molecular weight organic material being pigmented, and processing a pigment composition according to the invention, are preferably carried out subject to conditions under which only relatively weak shear forces occur so that the effect pigment is not broken up into smaller portions. Plastics comprising the pigment of the invention in amounts of 0.1 to 50 percent by weight, in particular 0.5 to 7 percent by weight. In the coating sector, the pigments of the invention are employed in amounts of 0.1 to 10 percent by weight. In the pigmentation of binder systems, for example for paints and printing inks for intaglio, offset or screen printing, the pigment is incorporated into the printing ink in amounts of 0.1 to 50 percent by weight, preferably 5 to 30 percent by weight and in particular 8 to 15 percent by weight.

The colorations obtained, for example in plastics, coatings or printing inks, especially in coatings or printing inks, more especially in coatings, may be distinguished by excellent properties, especially by extremely high saturation, outstanding fastness properties, high color purity, high goniochromaticity and high sparkle intensity at all angles.

When the high molecular weight material being pigmented is a coating, it is especially a speciality coating, very especially an automotive finish.

The effect pigments according to the invention are also suitable for making-up the lips or the skin and for colouring the hair or the nails.

The invention accordingly relates also to a cosmetic preparation or formulation comprising from 0.0001 to 90 percent by weight of a pigment, especially an effect pigment, according to the invention and from 10 to 99.9999 percent of a cosmetically suitable carrier material, based on the total weight of the cosmetic preparation or formulation.

Such cosmetic preparations or formulations are, for example, lipsticks, blushers, foundations, nail varnishes and hair shampoos. The pigments may be used singly or in the form of mixtures. It is, in addition, possible to use pigments according to the invention together with other pigments and/or colorants, for example in combinations as described hereinbefore or as known in cosmetic preparations.

The cosmetic preparations and formulations according to the invention preferably contain the pigment according to the invention in an amount from 0.005 to 50 percent by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eyeliners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25 degrees centigrade, silicone waxes, such as methyloctadecane-oxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25 degrees centigrade, sugar glycerides and oleates, myristates, lanolates, stearates and dihydroxystearates of calcium, magnesium, zirconium and aluminium.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410 Degrees centigrade silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91 percent by weight of the total weight of the preparation. The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sunprotection filters, or a mixture of such substances. A lipophilic functional cosmetic active ingredient suitable for skin cosmetics, an active ingredient composition or an active ingredient extract is an ingredient or a mixture of ingredients that is approved for dermal or topical application. The following may be mentioned by way of example: active ingredients having a cleansing action on the skin surface and the hair; these include all substances that serve to cleanse the skin, such as oils, soaps, synthetic detergents and solid substances; active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example (R)Grillocin (combination of zinc ricinoleate and various additives) or triethyl citrate (optionally in combination with an antioxidant, such as, for example, butyl hydroxytoluene) or ion-exchange resins; active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers); suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated T?O2, zinc oxide or mica; active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U.

Kindl, Gustav-Fischer-Verlag Stuttgart/New York, 1991) on page 161; active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin; moisturising substances: the following substances, for example, are used as moisture-controlling agents (moisturisers): sodium lactate, urea, alcohols, sorbitol, glycerol, propylene glycol, collagen, elastin and hyaluronic acid; active ingredients having a keratoplastic effect: benzoyl peroxide, retinoic acid, colloidal sulfur and resorcinol; antimicrobial agents, such as, for example, triclosan or quaternary ammonium compounds; oily or oil-soluble vitamins or vitamin derivatives that can be applied dermally: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide); —vitamin-based placenta extracts: active ingredient compositions comprising especially vitamins A, C, E, B1, B2, B6, B12, folic acid and biotin, amino acids and enzymes as well as compounds of the trace elements magnesium, silicon, phosphorus, calcium, manganese, iron or copper; skin repair complexes: obtainable from inactivated and disintegrated cultures of bacteria of the bifidus group; plants and plant extracts: for example arnica, aloe, beard lichen, ivy, stinging nettle, ginseng, henna, camomile, marigold, rosemary, sage, horsetail or thyme; animal extracts: for example royal jelly, propolis, proteins or thymus extracts; cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grape-seed oil or wheatgerm oil.

The preparations in stick form are preferably anhydrous but may in certain cases comprise a certain amount of water which, however, in general does not exceed 40 percent by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8 percent by weight of the fatty phase, from 1 to 98.8 percent by weight of the aqueous phase and from 0.2 to 30 percent by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers. If the preparations are in the form of a powder, they consist substantially of a mineral or inorganic or organic filler such as, for example, talcum, kaolin, starch, polyethylene powder or polyamide powder, as well as binders, colorants etc.

Such preparations may likewise comprise various adjuvants conventionally employed in cosmetics, such as fragrances, antioxidants, preservatives etc. If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5 percent by weight.

The cosmetic preparations and formulations according to the invention may also be used for colouring the hair, in which case they are used in the form of shampoos, creams or gels that are composed of the base substances conventionally employed in the cosmetics industry and a pigment according to the invention. The cosmetic preparations and formulations according to the invention are prepared in conventional manner, for example by mixing or stirring the components together, optionally with heating so that the mixtures melt.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

Comparative Example 1

Preparation of Titanium Oxide Coated Perlite (ComPro1)

Perlite flakes are prepared as described in example 1 of European patent application no. 08171357.0:
a) Perlite flakes (Optimat™ 2550 from World Minerals) are homogeneously dispersed in deionized water in an amount of 10% by weight. The particles are let to settle 5 minutes and the settled particles are removed from the suspension. The operation is repeated 3 times. Said operation allows eliminating 3D twin structure particles contained in milled expanded perlite.

b) Then the particles in suspension are let to settle during 8 hours. After that the water containing the smallest particles of perlite is disgarded. The operation is repeated 3 times. Then the particles are filtered and dried. The particle size distribution of the obtained perlite particles (=PE25), measured by laser (He—Ne laser 632.8 nm) light diffraction with a Malvern Mastersizer S Longbench, shows the following parameters:

| D (v, 0.1) µm | D (v, 0.5) µm | D (v, 0.9) µm |
|---|---|---|
| 9.4 | 25.1 | 51.5 | c) 25 g of the perlite flakes (PE25) are dispersed in 300 ml of deionised water and heated at 90° C.

c1) The pH of the suspension is set at 1.5 and 5 ml of a solution comprising 9 g of $SnCl_4/5H_2O$, 5 g of 37% HCl, and 100 g water is added at a speed of 0.5 ml per minute while keeping the pH constant with continuous addition of KOH.

c2) Then the pH is set at 1.8 and 200 ml of a solution comprising 34 g of $TiOCl_2$, 32 g of 37% HCl and 445 g distilled water are added at a speed of 1.5 ml per minute while keeping the pH at 1.8 with 1M KOH.

The step c1) is repeated and thereafter step c2) is repeated.

A powder with bright silver appearance (ComPro1) is obtained after filtration, drying and calcination in air. Element analysis indicates 13.9 weight % of Ti and 1 weight % of Sn. X-ray diffraction spectrum indicates that the coating consists of rutile $TiO_2$.

Comparative Example 2

Preparation of Titanium Oxide Coated Perlite (ComPro2)

Perlite flakes are prepared as described in Comparative Example 1. Before the decanting operation is done the perlite flakes are desagglomerated in a mixer. The particle size distribution of the thus obtained perlite particles (=PE21), measured by laser (He—Ne laser 632.8 nm) light diffraction with a Malvern Mastersizer S Longbench, shows the following parameters:

| D (v, 0.1) µm | D (v, 0.5) µm | D (v, 0.9) µm |
|---|---|---|
| 7.3 | 21.0 | 44.4 | c) 25 g of the perlite flakes are dispersed in 300 ml of deionised water and heated at 90° C.

c1) The pH of the suspension is set at 1.5 and 5 ml of a solution comprising 10 g of $SnCl_4/5H_2O$, 5 g of 37% HCl, and 100 g water is added at a speed of 0.5 ml per minute while keeping the pH constant with continuous addition of KOH.

c2) Then the pH is set at 1.8 and 200 ml of a solution comprising 37 g of $TiOCl_2$, 35 g of 37% HCl and 445 g distilled water are added at a speed of 1.5 ml per minute while keeping the pH at 1.8 with 1M KOH.

The step c1) is repeated and thereafter step c2) is repeated.

A powder with bright silver color (ComPro2) is obtained after filtration, drying and calcination in air. Element analysis indicates 14.1 weight % of Ti and 1 weight % of Sn. X-ray diffraction spectrum indicates that the coating consists of rutile $TiO_2$.

Comparative Example 3

Preparation of Titanium Oxide Coated Synthetic Mica (ComPro3)

A slurry of 200 g synthetic mica with average particle size of 19 microns (Shantou F.T.Z. Sanbao Pearl Luster Mica Co. Ltd.) and the following particle size distribution

| D (v, 0.1) μm | D (v, 0.5) μm | D (v, 0.9) μm |
|---|---|---|
| 9.2 | 19.1 | 34.9 | in 2 L demineralized water in a 5 L Morton flask is stirred at 280 rpm. With the slurry at room temperature, the pH is lowered to 1.4 using HCl. Then 11.2 g of 20% $SnCl_4.5H_2O$ in HCl are added at 1.0 g/min, while maintaining the pH at 1.4 using 35% NaOH. After the addition, the slurry is stirred for 30 min before heating to 74° C. At said temperature, 300 g of a $TiOCl_2$ solution (22 g $TiO_2$/100 ml) is added at a rate of 2.0 g/min. The pH is maintained at 1.4 with 35% NaOH. A 50 ml sample is filtered and washed with 4×50 ml demineralized water. The filter cake is calcined for 20 minutes at 850° C., resulting in a pearl colored effect pigment (ComPro3).

Comparative Example 4

Preparation of Titanium Oxide Coated Synthetic Mica (ComPro4)

A slurry of 150 g of synthetic mica (Shantou F.T.Z. Sanbao Pearl Luster Mica Co. Ltd.) with the following particle size distribution

| D (v, 0.1) μm | D (v, 0.5) μm | D (v, 0.9) μm |
|---|---|---|
| 20.4 | 45.2 | 81.4 | is stirred in 1 L demineralized water in a 3 L Morton flask at 300 rpm. The slurry is heated to 82° C., and the pH is lowered to 1.4 using HCl. Then 20 g of 20% $SnCl_4.5H_2O$ in HCl are added at 2.2 g/min, while maintaining the pH at 1.4 using 35% NaOH. After the addition, the slurry is stirred for 30 min before adding 200 g of a $TiOCl_2$ solution (22 g $TiO_2$/100 ml) at a rate of 2.4 g/min. The pH is maintained at 1.4 with 35% NaOH. A 50 ml sample is filtered and washed with 4×50 mL demineralized water. The filter cake is calcined for 20 minutes at 850° C., resulting in a pearl colored effect pigment (ComPro4).

Comparative Example 5

Preparation of Iron Oxide Coated Perlite Via Chemical Vapour Deposition (ComPro5)

500 g of Perlite flakes (Optimat™ 2550 from World Minerals) are filled into the CVD-reactor which has already been described in EP-A-45851 (glass cylinder with a diameter of 15 cm, gas injection below the glass frit, glass cylinder length of 80 cm, lower end of the reactor is closed with a glass frit, the upper end with is closed with a cover plate with integrated filters, electric heating band wrapped around the glass cylinder) and fluidized with a nitrogen stream of 900 l/h. After heating the reactor up to 185° C. a content of 2.5 vol % of air is adjusted via a second gas stream of air. An additional nitrogen gas stream (200 l/h) is saturated with iron pentacarbonyl and continuously injected into the reactor. After 11 hours 410 ml $Fe(CO)_5$ have been transferred as vapor into the reactor and decomposed to thin iron oxide films on the surface of the perlite substrates. At the end a red effect pigment is obtained, which shows the following particle sizes a after 32μ-sieving:

| D (v, 0.1) μm | D (v, 0.5) μm | D (v, 0.9) μm |
|---|---|---|
| 9.4 | 25.1 | 51.5 |

The final product (ComPro5) shows a brilliant red color with a strong sparkle effect.

Comparative Example 6

Preparation of Titanium Oxide Coated Synthetic Mica (ComPro6)

A slurry of 200 g synthetic mica with average particle size of 12 microns (Shantou F.T.Z. Sanbao Pearl Luster Mica Co. Ltd.) and the following particle size distribution

| D (v, 0.1) μm | D (v, 0.5) μm | D (v, 0.9) μm |
|---|---|---|
| 5.1 | 12.0 | 24.9 | in 2 L demineralized water in a 5 L Morton flask is stirred at 280 rpm. With the slurry at room temperature, the pH is lowered to 1.4 using HCl. Then 13.2 g of 20% $SnCl_4.5H_2O$ in HCl are added at 1.0 g/min, while maintaining the pH at 1.4 using 35% NaOH. After the addition, the slurry is stirred for 30 min before heating to 74° C. At said temperature, 350 g of a $TiOCl_2$ solution (22 g $TiO_2$/100 ml) is added at a rate of 2.0 g/min. The pH is maintained at 1.4 with 35% NaOH. A 50 ml sample is filtered and washed with 4×50 ml demineralized water. The filter cake is calcined for 20 minutes at 850° C.

The final product (ComPro6) shows a velvet pearl appearance.

Comparative Example 7

Preparation of Titanium Oxide Coated Perlite (ComPro7)

A slurry of 200 g of a fine perlite with average particle size of 17 microns (PVP Corp.) and the following particle size distribution

| D (v, 0.1) μm | D (v, 0.5) μm | D (v, 0.9) μm |
|---|---|---|
| 6.6 | 17.5 | 34.2 | in 2 L demineralized water in a 5 L Morton flask is stirred at 280 rpm. With the slurry at room temperature, the pH is lowered to 1.4 using HCl. Then 12.5 g of 20% $SnCl_4.5H_2O$ in HCl are added at 1.0 g/min, while maintaining the pH at 1.4 using 35% NaOH. After the addition, the slurry is stirred for 30 min before heating to 74° C. At said temperature, 330 g of a $TiOCl_2$ solution (22 g $TiO_2$/100 ml) is added at a rate of 2.0 g/min. The pH is maintained at 1.4 with 35% NaOH. A 50 ml sample is filtered and washed with 4×50 ml demineralized water. The filter cake is calcined for 20 minutes at 850° C., resulting in a pearl effect pigment with subtle sparkle effect (ComPro7).

Example 1

Synthesis of a $TiO_2$-Coated White Pearl Pigment Based on 5.6% Perlite and 94.4% Synthetic Mica (Pro1)

A slurry of 94.4 g synthetic mica ($d_{50}$ (=D (v,0.5))=19 μm) and 5.6 g of Perlite (PE25) in 1 L demineralized water is stirred at 280 rpm in a 3 L Morton flask. With the slurry at room temperature, the pH is lowered to 1.4 using HCl. Then 5.6 g of 20% $SnCl_4.5H_2O$ in HCl are added at 1.0 g/min, while maintaining the pH at 1.4 using 35% NaOH. After the addition, the slurry is stirred for 30 min before heating to 74° C. At said temperature, 150 g of a $TiOCl_2$ solution (22 g $TiO_2$/100 ml) is added at a rate of 2.0 g/min. The pH is maintained at 1.4 with 35% NaOH. A 50 ml sample is filtered and washed with 4×50 ml demineralized water. The filter cake is calcined for 20 minutes at 850° C., resulting in a pearl colored effect pigment (Pro1).

Example 2

Synthesis of a $TiO_2$-Coated White Pearl Pigment Based on 11.1% Perlite and 88.9% Synthetic Mica (Pro2)

11.1 g perlite (PE25) and 88.9 g synthetic mica ($d_{50}$=19 μm) are coated as described in Example 1 with titanium oxide (rutile). A powder with bright silver appearance (EH 868) is obtained after filtration, drying and calcination in air (Pro2).

Example 3

Synthesis of a $TiO_2$-Coated White Pearl Pigment Based on 22.2% Perlite and 77.8% Synthetic Mica (Pro3)

22.2 g perlite (PE25) and 77.8 g synthetic mica ($d_{50}$=19 μm) are coated as described in Example 1 with titanium oxide (rutile). A powder with bright silver appearance (Pro3) is obtained after filtration, drying and calcination in air.

Example 4

Synthesis of a $TiO_2$-Coated White Pearl Pigment Based on 33.3% Perlite and 66.7% Synthetic Mica (Pro4)

33.3 g perlite (PE25) and 66.7 g synthetic mica ($d_{50}$=19 μm) are coated as described in Example 1 with titanium oxide (rutile). A powder with bright silver appearance (Pro4) is obtained after filtration, drying and calcination in air.

Example 5

Synthesis of a $TiO_2$-Coated White Pearl Pigment Based on 5.6% Perlite and 94.4% Synthetic Mica (Pro5)

5.6 g perlite (PE21) and 94.4 g synthetic mica ($d_{50}$=19 μm) are coated as described in Example 1 with titanium oxide (rutile). A powder with bright silver appearance (Pro5) is obtained after filtration, drying and calcination in air.

Example 6

Synthesis of a $TiO_2$-Coated White Pearl Pigment Based on 11.1% Perlite and 88.9% Synthetic Mica (Pro6)

11.1 g perlite (PE21) and 88.9 g synthetic mica ($d_{50}$=19 μm) are coated as described in Example 1 with titanium oxide (rutile). A powder with bright silver appearance (Pro6) is obtained after filtration, drying and calcination in air.

Example 7

Synthesis of a $TiO_2$-Coated White Pearl Pigment Based on 22.2% Perlite and 77.8% Synthetic Mica (Pro7)

22.2 g perlite (PE21) and 77.8 g synthetic mica ($d_{50}$=19 μm) are coated as described in Example 1 with titanium oxide (rutile). A powder with bright silver appearance (Pro7) is obtained after filtration, drying and calcination in air.

Example 8

Synthesis of a $TiO_2$-Coated White Pearl Pigment Based on 33.3% Perlite and 66.7% Synthetic Mica (Pro8)

33.3 g perlite (PE21) and 66.7 g synthetic mica ($d_{50}$=19 μm) are coated as described in Example 1 with titanium oxide (rutile). A powder with bright silver appearance (Pro8) is obtained after filtration, drying and calcination in air.

Example 9

Pro9

1.4 g titanium oxide coated perlite (ComPro1) and 23.6 g titanium oxide coated synthetic mica (ComPro4) are dry-blended by using a skandex shaker (without beads) for a few minutes. The homogenous pigment shows a brilliant silver appearance (Pro9)

Example 10

Pro10

2.78 g titanium oxide coated perlite (ComPro1) and 22.22 g titanium oxide coated synthetic mica (ComPro4) are dry-blended by using a skandex shaker (without beads) for a few minutes. The homogenous pigment shows a brilliant silver appearance (Pro10).

Example 11

Pro11

5.55 g titanium oxide coated perlite (ComPro1) and 19.45 g titanium oxide coated synthetic mica (ComPro4) are dry-blended by using a skandex shaker (without beads) for a few minutes. The homogenous pigment showed a brilliant silver appearance (Pro11).

Example 12

Pro12

8.33 g titanium oxide coated perlite (ComPro1) and 16.67 g titanium oxide coated synthetic mica (ComPro4) are dry-blended by using a skandex shaker (without beads) for a few minutes. The homogenous pigment shows a brilliant silver appearance (Pro12).

Example 13

Pro17

1.4 g titanium oxide coated perlite (ComPro7) and 23.6 g titanium oxide coated synthetic mica (ComPro6) are dry-blended by using a skandex shaker (without beads) for a few minutes. The homogenous pigment shows a smooth silver appearance (Pro9)

Example 14

Pro18

2.78 g titanium oxide coated perlite (ComPro7) and 22.22 g titanium oxide coated synthetic mica (ComPro6) are dry-blended by using a skandex shaker (without beads) for a few minutes. The homogenous pigment shows a smooth silver appearance (Pro18).

Example 15

Pro19

5.55 g titanium oxide coated perlite (ComPro7) and 19.45 g titanium oxide coated synthetic mica (ComPro6) are dry-blended by using a skandex shaker (without beads) for a few minutes. The homogenous pigment shows a smooth silver appearance (Pro19).

Example 16

Pro20

8.33 g titanium oxide coated perlite (ComPro7) and 16.67 g titanium oxide coated synthetic mica (ComPro6) are dry-blended by using a skandex shaker (without beads) for a few minutes. The homogenous pigment shows a smooth silver appearance (Pro20).

Test System for Determination of the Sparkling Behavior

All examples are tested in a basecoat/clearcoat spray application:
Basecoat:
Polyester/CAB, solventborne, medium solid, dry film thickness ~20 μm
Total Pigment: Binder (solid)=0.20
Pigmentation: 90 parts effect pigment: 10 parts Colour Black FW 200 (Evonik Industries)

The dry blend of 90 parts sparkling pigment is combined in a binder with 10 parts of a black pigment.

Clearcoat:
1K-clearcoat, ~40 μm dry-film thickness
Quantitative Determination of the Angle Dependant Sparkling Behavior The sparkling effects of the pigments of Examples 1 to 16 as well as Comparative Examples 1 to 6 are measured using a Byk-mac device from Byk-Gardner GmbH (Lausitzer Straβe 8, 82538 Geretsried, Germany). This device is allowing to measure sparkle and graininess for flake characterization. Accordingly, the sparkling behaviour of the products (Pro1 to Pro12 and Pro17 to Pro20) and the comparative products (ComPro1 to ComPro4, ComPro6 and ComPro7) is characterized for three different illumination angles (direct illumination: 15°, 45° and 75° from perpendicular; camera detection: 0°) with the following parameters:

Sparkling area (S_a) corresponds to the number of light reflections within the measuring given;
Sparkling intensity (S_i) corresponds the intensity of the light reflections.

FIG. 1 is a graph showing the Sparkling intensity (S_i) vs. the Sparkling area (S_a) [illumination angle: 75°, 45° and 15° from the left hand side to ride hand side] of Pro1 to Pro4 and ComPro1 and ComPro3.

FIG. 2 is a graph showing the Sparkling intensity (S_i) vs. the Sparkling area (S_a) of Pro5 to Pro8 and ComPro2 and ComPro3.

FIG. 3 is a graph showing the Sparkling intensity (S_i) vs. the Sparkling area (S_a) of Pro9 to Pro12 and ComPro1 and ComPro4.

FIG. 4 is a graph showing the Sparkling intensity (S_i) vs. the Sparkling area (S_a) of Pro17 to Pro20 and ComPro6 and ComPro7.

The invention claimed is:
1. A sparkling effect pigment comprising:
A) a plate-like substrate of perlite coated with a dielectric material, wherein the dielectric material is a metal oxide selected from $TiO_2$, $ZrO_2$, $Fe_2O_3$, $Fe_3O_4$, $Cr_2O_3$, ZnO, or mixtures of said metal oxides; and
B) a plate-like substrate of mica, coated with a dielectric material, wherein the dielectric material is a metal oxide selected from $TiO_2$, $ZrO_2$, $Fe_2O_3$, $Fe_3O_4$, $Cr_2O_3$, ZnO, or mixtures of said metal oxides, and
wherein the coated plate-like substrate of perlite is contained in an amount of 1-80% by weight based on the sum of coated plate-like substrate of perlite and coated plate-like substrate of mica.
2. The sparkling effect pigment according to claim 1 wherein the coated plate-like substrate of mica with a medium particle size of 12 to 30 μm, is combined with the coated plate-like substrate of perlite with a medium particle size of 12 to 30 μm.
3. The sparkling effect pigment according to claim 1, wherein the plate-like substrate of mica is a natural mica.
4. The sparkling effect pigment according to claim 1, wherein the plate-like substrate of mica is a synthetic mica.
5. The sparkling effect pigment according to claim 1, wherein the plate-like substrate of perlite and/or mica is coated with at least three alternating layers of high and low refractive index, and wherein the at least three alternating layers are $TiO_2/SiO_2/TiO_2$, $(SnO_2)TiO_2/SiO_2/TiO_2$, $(SnO_2)TiO_2/SiO_2/(SnO_2)TiO_2$, $TiO_2/SiO_2/TiO_2/SiO_2/TiO_2$, $Fe_2O_3/SiO_2/TiO_2$, or $TiO_2/SiO_2/Fe_2O_3$.
6. The sparkling effect pigment according to claim 1, wherein the pigment has the following layer structure:

| | | | |
|---|---|---|---|
| perlite/mica | TiO$_2$ | SiO$_2$ | TiO$_2$ |
| perlite/mica | TiO$_2$ | SiO$_2$ | Fe$_2$O$_3$ |
| perlite/mica | TiO$_2$ | SiO$_2$ | TiO$_2$•Fe$_2$O$_3$ |
| perlite/mica | TiO$_2$ | SiO$_2$ | (Sn,Sb)O$_2$ |
| perlite/mica | (Sn,Sb)O$_2$ | SiO$_2$ | TiO$_2$ |
| perlite/mica | Fe$_2$O$_3$ | SiO$_2$ | (Sn,Sb)O$_2$ |
| perlite/mica | TiO$_2$•Fe$_2$O$_3$ | SiO$_2$ | TiO$_2$•Fe$_2$O$_3$ |
| perlite/mica | TiO$_2$ | SiO$_2$ | MoS$_2$ |
| perlite/mica | TiO$_2$ | SiO$_2$ | Cr$_2$O$_3$ |
| perlite/mica | Cr$_2$O$_3$ | SiO$_2$ | TiO$_2$ |
| perlite/mica | Fe$_2$O$_3$ | SiO$_2$ | TiO$_2$ |
| perlite/mica | TiO$_2$ | Al$_2$O$_3$ | TiO$_2$ |
| perlite/mica | Fe$_2$TiO$_5$ | SiO$_2$ | TiO$_2$ |
| perlite/mica | TiO$_2$ | SiO$_2$ | Fe$_2$TiO$_5$/TiO$_2$ |
| perlite/mica | TiO$_2$ | SiO$_2$ | TiO$_2$/SiO$_2$/TiO$_2$ + Prussian Blue |
| perlite/mica | TiO$_2$ | SiO$_2$ | TiO$_2$/SiO$_2$/TiO$_2$ |
| perlite/mica | TiO$_2$/SiO$_2$/TiO$_2$ | SiO$_2$ | TiO$_2$/SiO$_2$/TiO$_2$ |
| perlite/mica | (SnO$_2$)TiO$_2$ | SiO$_2$ | (SnO$_2$)TiO$_2$. |

7. The sparkling effect pigment according to claim 1, wherein the pigment comprises a TiO$_2$ coated synthetic mica with a d$_{50}$ of about 25 μm and a TiO$_2$ coated perlite with a d$_{50}$ of about 20 μm, or the pigment comprises a TiO$_2$ coated synthetic mica with a d$_{50}$ of about 20 μm and a TiO$_2$ coated perlite with a d$_{50}$ of about 20 μm, or the pigment comprises a TiO$_2$ coated synthetic mica with a d$_{50}$ of about 40-60 μm and a TiO$_2$ coated perlite with a d$_{50}$ of about 20-30 μm; or the pigment comprises a TiO$_2$ coated mica with a d$_{50}$ of about 12 μm and a TiO$_2$ coated perlite with a d$_{50}$ of about 17 μm.

8. The sparkling effect pigment according to claim 1, wherein the pigment comprises a Fe$_2$O$_3$ coated synthetic mica based pigment with a d$_{50}$ of about 20-25 μm and a Fe$_2$O$_3$ coated perlite based pigment with a d$_{50}$ of about 20 μm, or the pigment comprises a Fe$_2$O$_3$ coated synthetic mica based pigment with a d$_{50}$ of about 40-60 μm and a Fe$_2$O$_3$ coated perlite based pigment with a d$_{50}$ of about 20-30 μm.

9. A method of using the sparkling effect pigments according to claim 1 comprising incorporating the pigments in paints, ink-jet printing, for dyeing textiles, for pigmenting coatings, printing inks, plastics, cosmetics, glazes for ceramics and glass.

10. Paints, printing inks, plastics, cosmetics, ceramics and glass, which are pigmented with the sparkling effect pigment according claim 1.

11. A process for the production of the sparkling effect pigments according to claim 1, comprising
blending of a dielectric material coated plate-like substrate of perlite and of a dielectric material coated plate-like substrate of mica; or
blending of the uncoated plate-like perlite and mica substrates and
coating them in a chemical vapour deposition (CVD) or a wet-chemical process with one, or more layers of a dielectric material, and optionally starting the coating process with one of the substrates and adding the other in a later stage.

12. The sparkling effect pigment according to claim 3, wherein the natural mica is muscovite mica.

13. The sparkling effect pigment according to claim 4, wherein the synthetic mica is fluorophlogopite.

14. The sparkling effect pigment according to claim 1, wherein the coated plate-like substrate of perlite is contained in an amount of 5-80% by weight based on the sum of coated plate-like substrate of perlite and coated plate-like substrate of mica.

15. The sparkling effect pigment according to claim 1, wherein the coated plate-like substrate of perlite is contained in an amount of 10-50% by weight based on the sum of coated plate-like substrate of perlite and coated plate-like substrate of mica.

16. The sparkling effect pigment according to claim 1, wherein the coated plate-like substrate of perlite is contained in an amount of 10-40% by weight based on the sum of coated plate-like substrate of perlite and coated plate-like substrate of mica.

* * * * *